… # omitted by system

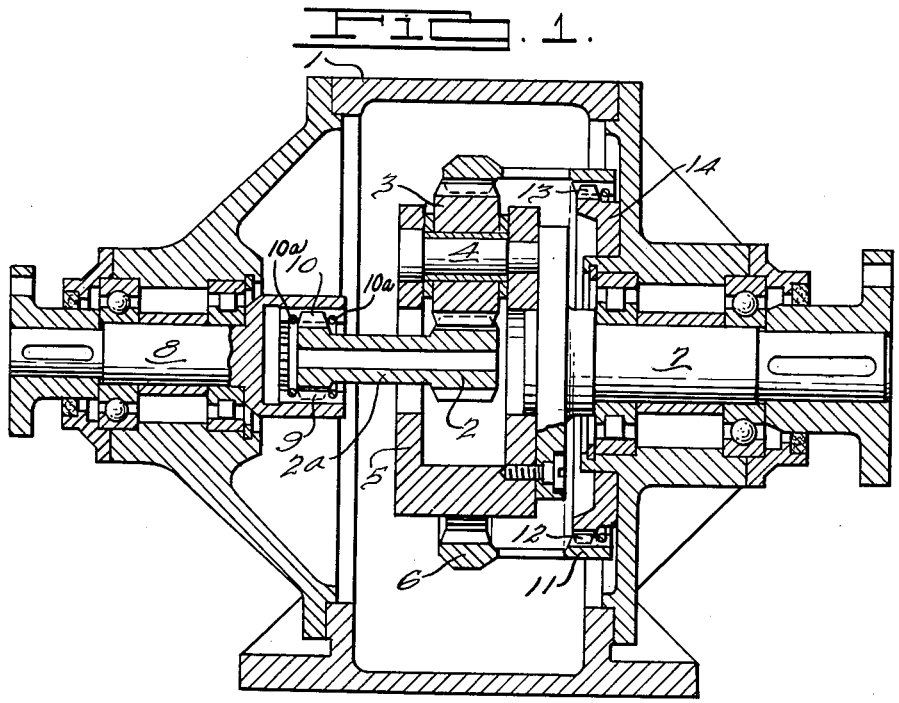

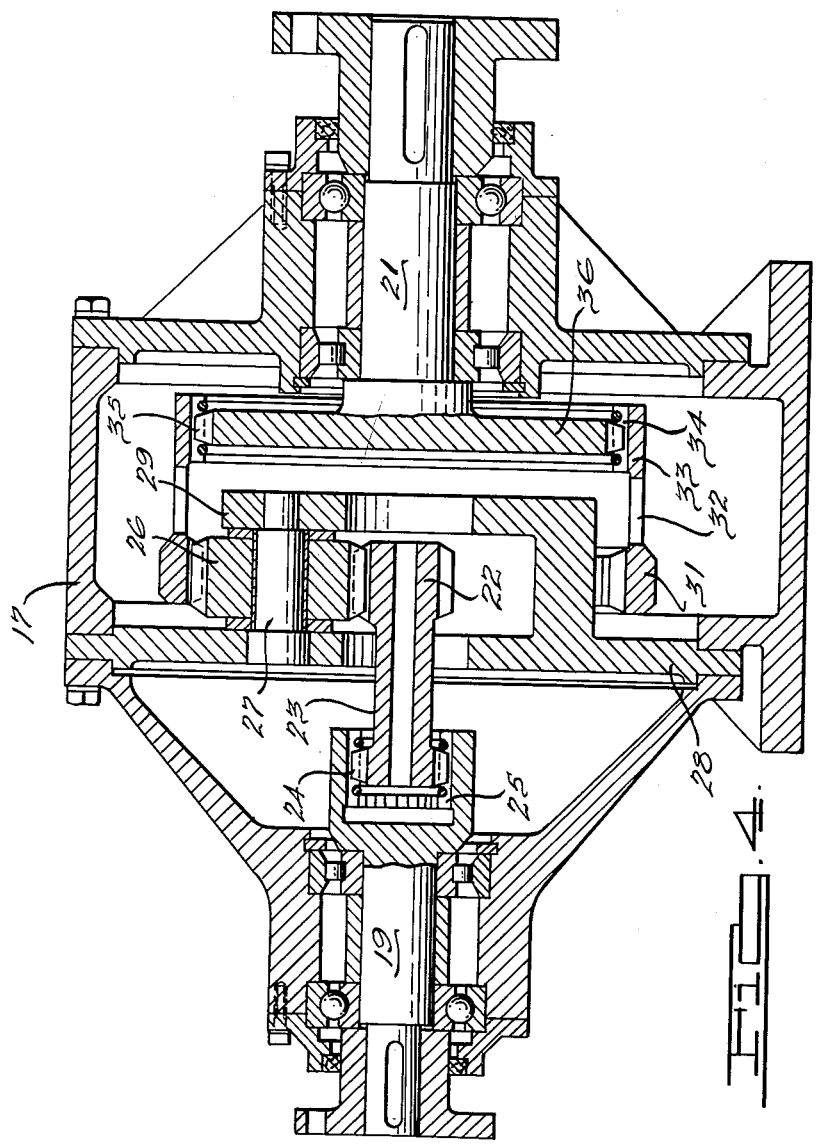

United States Patent Office 3,021,731
Patented Feb. 20, 1962

3,021,731
PLANETARY GEAR TRANSMISSION
Wilhelm G. Stoeckicht, 4 Rugendasstrasse,
Munich-Solln, Germany
Filed June 13, 1958, Ser. No. 742,973
Claims priority, application Germany Nov. 10, 1951
8 Claims. (Cl. 74—801)

This invention relates to gear transmissions, and more particularly to transmissions of the type having central and non-central gears (for example, planetary gear transmissions) and which incorporate means for insuring that the load on the non-central gears is at all times distributed equally among them. It should be understood that the term "gear transmissions" in connection with the present invention is not limited to transmissions with rotatable planet gear carriers but also includes such transmissions in which the non-central gear carriers are stationary. This application is a continuation in part of application Serial No. 319,350, now abandoned, filed November 7, 1952, by the present applicant.

Gear transmissions are known according to which the equal load distribution among the non-central gears is accomplished by providing a flexible connection between at least one central gear and that part of the assembly which takes up the torque of said central gear, so that this central gear can adjust itself in accordance with a balancing of forces acting upon it. The term "central gear" is of course intended to refer to either a sun gear or orbit gear of a transmission. The flexible connection mentioned above must comprise two flexible joints as otherwise the correct mesh of teeth between the central gear and the non-central gears would be impaired in consequence of angular misalignments which would arise between the axes of the self-adjusting central gear and the non-central gear in mesh therewith. An example of such a known structure is a planetary gear transmission the self-adjusting central gear of which is connected to that part of the assembly which takes up the torque of said central gear, by means of a coupling member in the form of a double-jointed toothed coupling. Such constructions have been found to be comparatively cumbersome and expensive to produce.

It is an object of the present invention to overcome the deficiencies of previously known gear transmissions of this type and to provide an improved and simplified gear transmission which provides for continuously equal load distribution among the non-central gears in a simplified and less cumbersome way and with decreased production cost.

It is another object to provide an improved gear transmission of this nature which is easy to maintain, inexpensive to produce, and compact in structure, and may take the form of a transmission with a rotatable planet carrier, or one in which the non-central gear carrier is stationary.

Other objects, features and advantages of the present invention will become apparent from the subsequent description, taken in conjunction with the accompanying drawings.

In the drawings:

FIGURE 1 is a longitudinal section through an embodiment of a planetary gear transmission constructed according to the invention, the transmission being of the type in which the planet carrier rotates;

FIGURE 2 is a perspective view (slightly exaggerated) of a tooth designed in conformity with the principles of the invention;

FIGURE 3 is a fragmentary perspective view of a portion of the orbit gear in the transmission of FIGURE 1, and FIGURE 4 is a longitudinal section through another embodiment of the invention comprising a transmission having a stationary gear carrier.

In general terms, the invention comprises a gear transmission in which at least one of the central gears (that is, the orbit or sun gear) and the non-central gears have mating sets of teeth one set of which has flanks which are slightly crowned in a longitudinal direction, so that limited rocking action may take place between this central gear and non-central gears while they are in mesh. This central gear has an axial extension which connects it with that part of the assembly taking up the torque of said central gear, such part being either a shaft or the stationary housing. The connection between this extension and part is flexible to permit limited angular shifting of the extension with respect to the part. This connection, taken together with the crowned teeth, constitutes flexible coupling means which not only permits radial displacement of the central gear to maintain equal load distribution among the non-central gears, but also permits relative angular shifting between the axes of the central gear and the non-central gears, this angular displacement not affecting the correct meshing engagement between the driving teeth of the central gear and the non-central gears. The crowned teeth may be provided only on the non-central gears, or on the teeth of one or both central gears instead of or in addition to the non-central gears. The construction may be applied to transmissions in which the planet carrier rotates or in constructions where the carrier is fixed to the housing.

Referring more particularly to the drawings, the construction as shown in FIGURES 1–3 comprises a casing 1 having arranged therein a planetary gear transmission which comprises an inner central gear or sun gear 2, a plurality of planet gears 3, which may be in any desired number, for instance, three as in the illustrated embodiment, and an outer central gear 6, sometimes referred to as a ring or orbit gear. The three planet gears 3 are preferably equidistantly spaced in a circumferential direction around sun gear 2. Planet gears 3 are respectively mounted on shafts or pins 4 carried by a planet carrier 5. This carrier is secured to one transmission shaft 7 rotatably journaled in casing 1. The other transmission shaft 8, the axis of which is in alignment with the axis of shaft 7, is likewise rotatably journaled in casing 1. That end of transmission shaft 8 which is adjacent the planetary gear transmission is provided with coupling teeth 9 interfitting with corresponding teeth 10 of an extension 2a on sun gear 2, retaining rings 10a being provided to hold the coupling teeth in position. Similarly orbit gear 6 is provided with an extension 11 carrying coupling teeth 12 which interfit with corresponding teeth 13 of a ring 14. Ring 14 is fixed to casing 1 which represents the element or part taking up the torque of orbit gear 6. It should be noted that teeth 9, 10, 12 and 13 are not gear teeth in the ordinary sense since they do not advance over each other or go into and out of mesh. Instead, they may be referred to as coupling teeth and as such, relative angular movement of a limited nature may take place between the sets of teeth without affecting their ability to transmit torque. Each set of coupling teeth 9, 10 and 12, 13 thus constitutes, in effect, a single flexible or universal joint.

According to the invention, the flanks of some or all of the gear teeth in the planetary transmission are slightly crowned. Preferably, the arrangement is such that the teeth of planet gears 3 are slightly crowned in the manner shown as exaggerated in FIGURE 2. It will be noted that the crown is in a longitudinal direction along each tooth, so that limited relative angular displacement between the planet gears on the one hand and either the sun or orbit gear on the other hand will not affect the correct conjugate action between these teeth as they move into and out of mesh. It should be understood that sun gear 2 and orbit gear 6 could have slightly crowned teeth instead of or in addition to the crowned teeth on planet gears 3 within the principles of the invention. The crowned shape of the toothed flanks on planet gears 3 may be circular, arc-shaped, elliptical or shaped in accordance with other appropriate boundary lines.

As shown in FIGURE 3, extension 11 of orbit gear 6 is provided with apertured portions 16 so that the annular surface of extension 11 is interrupted, preferably in symmetrical arrangement. Thus, a structure is obtained according to which orbit gear 6 is connected with the portion of extension 11 carrying coupling teeth 12 by means of a number of thin-walled arms 16a which are non-resistant to bending so that elastic deformation of orbit gear 6 as caused by radial forces on the teeth will not be substantially affected.

In operation of the embodiment shown in FIGURES 1–3, when power or torque is being transmitted through the transmission, sun gear 2 will adjust itself in conformity with the resultant tooth pressures acting on it by virtue of its meshing contact with planet gears 3. It should be noted that since sun gear 2 is not supported by bearings but by planet gears 3, it will be capable of radial movement in order to maintain equal load distribution among the planet gears. In addition to possible radial shifting, this self-adjustment of sun gear 2 will generally cause obliquity or inclination of its axis. In other words, a relative angular position of the axis of sun gear 2 and its extension 2a will be effected with respect to the axis of planet gears 3. This will mean that the teeth on sun gear 2 will be angularly related to the teeth on the planet gears. This last-mentioned angular positioning would normally impair the proper rolling engagement between the flanks of the sun gear and planet gear teeth, and would furthermore cause edging, noisy running, and shorten the life of the gears. However, due to the slightly crowned shape of the flanks of the planet gear teeth in conformity with the present invention, the sun gear teeth and planet gear teeth would still continue to move properly into and out of mesh, the connection between these teeth being somewhat similar to a universal joint in this respect.

The engagement of the slightly crowned teeth on planet gears 3 with orbit gear 6 will have a similar effect in that relative angularity between the axes of the orbit gear and the planet gears will be permitted with the teeth of these gears still maintaining their correct meshing relationship. Here again, the engagement of the planet gear teeth and orbit gear teeth in this manner will create an effect similar to that of a universal joint permitted limited relative angular movement.

It should be noted that in the case of both the sun gear and orbit gear, the coupling teeth 10 and 12 respectively on the extensions of these gears may likewise change their angular position relative to coupling teeth 9 and 13. Sufficient clearance is of course provided between these two sets of coupling teeth to permit such angular shifting to take place. However, this angular shifting will not affect the proper functioning of teeth 9, 10, 12 and 13 since each set of coupling teeth will stay in constant mesh without any involute or rolling action such as takes place between the gear teeth. The fact that each set of coupling teeth (9, 10 and 12, 13) acts as a form of universal coupling will permit radial shifting of sun gear 2 and orbit gear 6 with respect to the shaft axis in addition to the angular shifting described above. Flexible arms 16a formed by the apertured portions in extension 11 of orbit gear 6 will permit bending or distortion of the connection between orbit gear 6 and ring 14. This will insure that extension 11 will not hinder elastic deformations of orbit gear 6 which may occur due to the effect of radial components of the gear tooth forces. This flexible construction, which in itself is known, will thus aid in properly distributing the load on the planet gears. It should be understood that the shape of apertured portions 16 could be varied to suit particular conditions, and could be replaced by bores or the like.

As indicated above, instead of crowning the teeth of planet gears 3, the teeth of sun gear 2 and orbit gear 6, or of the entire planetary gear transmission, may be crowned without affecting the principles of the present invention. If, in conformity with the embodiment shown in FIGURES 1–3, only planet gears 3 are provided with slightly crowned toothed flanks, the advantage is obtained that sun gear 2 and orbit gear 6 can move in an axial direction without thereby causing a change of position of the mesh of their teeth with respect to planet gears 3. This may be of importance, for instance, when directly connecting a planetary gear transmission constructed according to the invention with a steam turbine rotor, because such rotors, when in operation, generally are subjected to elongation which then leads to a change in axial position of the central gear coupled thereto.

As discussed above, the link-like connections for sun gear 2 and orbit gear 6 are in the form of coupling tooth sets 9, 10, and 12, 13. It should be understood, however, that any other connections, for example, rubber connections, may be alternatively used, provided such connections allow limited angular positioning of the respective axes. It should also be noted that the invention is applicable to planetary gear transmissions having spur or straight teeth as well as those with helical teeth.

FIGURE 4 illustrates another embodiment of the invention generally similar in principle to that described above, but in which the gear carrier is fixed. In this embodiment, a casing 17 is provided, this casing carrying a first shaft 19 and a second shaft 21 which are rotatably mounted at opposite ends of the casing in co-axial relationship. A sun gear 22 is disposed within casing 17 and has an extension 23, the outer end of this extension carrying coupling teeth 24. The inner end of shaft 19 has internal coupling teeth 25 which interfit with coupling teeth 24 to provide a flexible connection between sun gear 22 and shaft 19.

A plurality of non-central gears 26 are provided, these gears being equidistantly spaced around sun gear 22 so that the sun gear is supported by the non-central gears. Each planet gear 26 is rotatably mounted on a shaft 27 which is supported between a wall 28 of the casing and a carrier 29 secured to said wall. It will thus be seen that non-central gears 26 are on fixed axes with respect to the casing. An internally toothed orbit gear 31 surrounds and is supported by non-central gears 26, and has a flexible extension 32 similar to that of the previous embodiment. The other end of extension 32 carries a coupling tooth ring 33 in which are formed a plurality of coupling teeth 34. These teeth interfit with a plurality of coupling teeth 35 on an enlarged disk 36 formed at the inner end of shaft 21.

Preferably, as in the previous embodiment, the teeth on non-central gears 26 are slightly crowned in a longitudinal direction, thus providing a form of limited universal joint at their connections with sun gear 22 and orbit gear 31 respectively. Since these gears have flexible connections in the form of coupling teeth 24, 25 and 34, 35, with their respective shafts 19 and 21, both radial and angular shifting movement of sun gear 22 and orbit gear 31 will be permitted with respect to non-central gears 26, for the reasons described with respect to the previous embodiment.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a gear transmission, a casing member, first and second shaft members rotatably supported by said casing member on a common axis, a gear carrier fixed to one of said members, a plurality of at least three equidistantly spaced non-central gears rotatably supported by said carrier, a first central gear connected to another of said members and meshing with said non-central gears, a second central gear, an axial extension directly connected to said second central gear, a flexible connection between said axial extension and the remaining one of said members, and mating sets of gear teeth on said second central gear and said non-central gears, the flanks of at least one of said sets of teeth being of crowned shape in a longitudinal direction.

2. The combination according to claim 1, said flexible coupling comprising a first set of coupling teeth on said remaining member, and a second set of coupling teeth on said extension interfitting with said first set of coupling teeth, the relative dimensions of said sets of coupling teeth being such that limited angular shifting of said second central gear with respect to said remaining member may take place.

3. The combination according to claim 1, said crowned shapes being formed on said non-central gear teeth.

4. The combination according to claim 1, one of said central gears being an orbit gear.

5. In a gear transmission, a casing member, first and second shaft members rotatably supported by said casing member on a common axis, a gear carrier fixed to one of said members, a plurality of at least three equidistantly spaced non-central gears rotatably supported by said carrier, the flanks of said non-central gear teeth being crowned in a longitudinal direction, first and second central gears meshing with said non-central gears, extensions directly connected to said central gears, and flexible connections between said extensions and said other two members respectively, whereby both radial and angular shifting of said central gears with respect to said common axis will be permitted.

6. The combination according to claim 5, one of said central gears being an orbit gear, the extension on said orbit gear comprising a thin-walled and apertured tubular portion, the flexible coupling for said orbit gear including interfitting coupling teeth formed on said extension and its connected member.

7. In a planetary gear transmission, a casing, first and second shafts rotatably supported by said casing on a common axis, a planet gear carrier fixed to one of said shafts, a plurality of at least three equidistantly spaced planet gears rotatably supported by said carrier, a sun gear meshing with said planet gears, an axial extension directly connected to said sun gear, a flexible connection between said extension and said other shaft, an orbit gear meshing with said planet gears, an axial extension directly connected to said orbit gear, a flexible connection between said orbit gear extension and said casing, and teeth on said planet gears having flanks crowned in a longitudinal direction.

8. In a gear transmission, a casing, first and second shafts rotatably supported by said casing, a non-central gear carrier fixed to said casing, a plurality of at least three equidistantly spaced non-central gears rotatably supported by said carrier, a sun gear meshing with said non-central gears, an extension directly connected to said sun gear, a flexible coupling between said extension and one of said shafts, an orbit gear meshing with said non-central gears, an axial extension directly connected to said orbit gear, and a flexible coupling between said orbit gear extension and the other shaft, the teeth on said non-central gears having flanks crowned in a longitudinal direction, whereby both radial and angular movement of said sun and orbit gears with respect to said non-central gears will be permitted.

References Cited in the file of this patent

UNITED STATES PATENTS

| 618,272 | Johnson | Jan. 24, 1899 |
| 2,252,967 | Forton | Aug. 19, 1941 |
| 2,591,734 | Smith | Apr. 8, 1952 |
| 2,700,311 | Bade | Jan. 25, 1955 |
| 2,703,021 | Stoeckicht | Mar. 1, 1955 |

FOREIGN PATENTS

| 682,275 | Germany | Oct. 11, 1939 |
| 405,548 | Italy | Aug. 19, 1943 |
| 253,321 | Switzerland | Nov. 16, 1948 |
| 958,710 | France | Sept. 19, 1949 |
| 664,297 | Great Britain | Jan. 2, 1952 |